United States Patent [19]

Rasheed

[11] Patent Number: 5,712,233

[45] Date of Patent: Jan. 27, 1998

[54] ALKOXYLATE SURFACTANT COMPOSITIONS AND THE USE THEREOF IN PAPER DEINKING

[75] Inventor: Khalid Rasheed, Missouri City, Tex.

[73] Assignee: Witco Corporation, Greenwich, Conn.

[21] Appl. No.: 589,855

[22] Filed: Jan. 22, 1996

[51] Int. Cl.$^6$ .................................................. D21C 5/02
[52] U.S. Cl. ...................... 510/174; 510/413; 510/506; 252/60; 252/61; 162/4
[58] Field of Search ............................ 510/174, 413, 510/506; 252/60, 61; 162/4

[56] References Cited

U.S. PATENT DOCUMENTS

| | | |
|---|---|---|
| 3,377,234 | 4/1968 | Illingworth . |
| 3,932,206 | 1/1976 | Illingworth et al. . |
| 3,986,922 | 10/1976 | Parker et al. . |
| 4,311,552 | 1/1982 | Brucato et al. . |
| 4,518,459 | 5/1985 | Freis et al. . |
| 4,618,400 | 10/1986 | Wood et al. . |
| 4,666,558 | 5/1987 | Wood et al. . |
| 4,786,364 | 11/1988 | Tefft . |
| 4,820,379 | 4/1989 | Darlington . |
| 4,935,096 | 6/1990 | Gallagher et al. . |
| 4,964,949 | 10/1990 | Hamaguchi et al. . |
| 5,094,716 | 3/1992 | Letscher . |
| 5,100,574 | 3/1992 | Urushibata et al. . |
| 5,102,500 | 4/1992 | Darlington . |
| 5,120,397 | 6/1992 | Urushibata et al. . |
| 5,141,598 | 8/1992 | Richman et al. . |
| 5,151,155 | 9/1992 | Cody et al. . |
| 5,158,697 | 10/1992 | Kawamori et al. . |
| 5,259,969 | 11/1993 | Srivatsa et al. . |
| 5,281,348 | 1/1994 | Letscher . |
| 5,282,928 | 2/1994 | Takahashi et al. ............ 252/60 |
| 5,282,997 | 2/1994 | Richmann et al. . |
| 5,302,377 | 4/1994 | Pereira et al. ............ 510/174 |
| 5,304,316 | 4/1994 | Urushibata et al. ............ 252/60 |
| 5,414,144 | 5/1995 | Watanabe et al. ............ 568/670 |
| 5,417,807 | 5/1995 | Fossas et al. ............ 510/174 |
| 5,417,808 | 5/1995 | Okamoto et al. ............ 510/174 |
| 5,425,891 | 6/1995 | Pujol et al. ............ 510/174 |

FOREIGN PATENT DOCUMENTS 0 434 084  6/1991  European Pat. Off. .

OTHER PUBLICATIONS

Mak et al., "Characteristics of Fatty Acid as an Effective Flotation Deinking Collector," *2d Research Forum on Recycling*, 145–152 (1993) month unavailable.

Hans–Joachim Putz et al., "Deinking of Oil– and Waterborn Printing Inks—A New Flotation Deinking Model," *Recycling Forum*, 183–190 (1991) month unavailable.

Borchardt, "Chemical Structure– Property Relationships of Deinking Surfactants," *Progress in Paper Recycling*, 1(2):45–60 (Feb. 1992).

Borchardt, An Introduction To Deinking Surfactants, *Recycling Symposium*, 131–139 (1993) month unavailable.

*Primary Examiner*—Jacqueline V. Howard
*Attorney, Agent, or Firm*—Scully, Scott, Murphy & Presser

[57] ABSTRACT

Enhanced removal of ink in the froth flotation deinking of waste paper is provided by carrying out the flotation with one or more dialkoxylates of certain cyclohexenyl diacids, one or more alkoxylates of $C_{2-12}$ polyhydric alcohols, or a mixture thereof. Improved performance is also provided by adding one or more alkyl diglyceryl disulfonates. $C_8$ to $C_{18}$ alpha-olefin sulfonates and/or alkyl ether sulfates.

34 Claims, No Drawings

ALKOXYLATE SURFACTANT COMPOSITIONS AND THE USE THEREOF IN PAPER DEINKING

BACKGROUND OF THE INVENTION

The present invention relates to the treatment of waste paper to remove ink from the paper. More specifically, the present invention relates to novel surfactant compositions useful in the removal of ink from waste paper, and to the use of such novel surfactant compositions in the removal of ink from the paper.

The growing interest in recycling of used ("waste") paper as a source in the manufacture of new paper and paper products has increased the demand for effective products and processes which are adaptable to the processing of the many different types of paper currently used in commerce. In particular, there remains a strong interest in processes and reagents which are useful in the removal of ink from the waste paper. Obviously, it is highly desirable to maximize removal of ink from waste paper to permit the recycled waste paper to be as bright and clean as possible. Ideally, such reagents should be able to maximize removal of ink from types of paper currently known in commerce including newsprint, impact printed paper and non-impact printed paper. Such differing types of paper and the differing types of ink that may be used thereon, pose a challenge in the identification of useful, efficient surfactant formulations and processes which can be used in the removal of the ink from the paper. This challenge is particularly seen when the waste paper feedstock comprises a mixture of types of paper, as is often the case when the paper is obtained from business and industrial concerns.

The prior art demonstrates that various surfactants and surfactant combinations have been employed in the deinking of paper. While the techniques disclosed in the prior art may have been useful, nonetheless they are less than ideal for various reasons. Thus, there remains a need for surfactant formulations which exhibit the effectiveness and efficiency exhibited by the compositions in the present invention.

For instance, U.S. Pat. No. 4,311,552 discloses deinking waste material, such as waste newsprint, in a slurrying process using a deinking agent which comprises a $C_{14}$ to $C_{20}$ alpha olefin sulfonate, particularly in combination with a nonionic detergent such as a 9-mole phenyl ethoxylate.

U.S. Pat. No. 4,935,096 discloses deinking of waste paper, using as the deinking agent an ionic surfactant, alone or in combination with nonionic surfactants. Among the disclosed ionic surfactants, are anionic compounds derived from alkylbenzene or hydrocarbons, such as sodium alkylbenzene sulfonates, sodium alcohol ether sulfates, sodium alcohol sulfates, and sodium alkyl or dialkyl sulfosuccinates. Among the disclosed cationic surfactants are mono, di or tri alkyl quaternary ammonium compounds. Among the nonionic surfactants disclosed are alkyl phenyl ethoxylates, ethoxylates of alcohols or fatty acids, and "mixed ethylene/propylene oxide adducts".

U.S. Pat. No. 4,964,949 discloses deinking of waste paper employing a deinking agent which comprises a reaction product of one or more alkylene oxides with natural oils or fats and polyhydric alcohols, and also comprises a compound selected from the group consisting of alkylene oxide adducts of $C_{12}$ to $C_{18}$ alcohols, or sulfates of alkylene oxide adducts of $C_{10}$ to $C_{18}$ alcohols, or $C_8$ to $C_{22}$ fatty acids or salts thereof.

U.S. Pat. No. 5,158,697 discloses deinking of waste paper wherein the deinking agent comprises one or more of alkoxylated dimer acids and polymer acids of unsaturated fatty acids containing 16 to 20 carbon atoms; alkoxylates of partial esters of dimer acids and polymer acids of unsaturated fatty acids containing 16 to 20 carbon atoms esterified with alcohol containing 1 to 18 carbon atoms; or alkoxylated dicarboxylic acids or dicarboxylic acid monoesters of the following formula

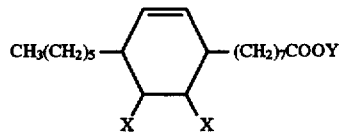

wherein one of the X groups is COOH and the other is H or $CH_3$, Y is H or R, and R is an alkyl group containing 1 to 18 carbon atoms.

BRIEF SUMMARY OF THE INVENTION

One aspect of the present invention is a deinking composition useful in the froth flotation deinking of waste paper, comprising one or more surfactants selected from the group consisting of (A) cyclohexenyl dialkoxylates of the formula (A)

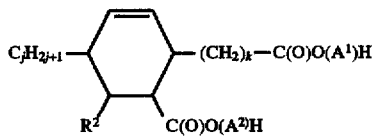

wherein $R^2$ is H or $CH_3$, j is 1–11, k is 1–11 and (j+k) is 10–14, $A^1$ and $A^2$ are polyalkoxy chains composed of propoxy units, ethoxy units, or both propoxy and ethoxy units, and the dialkoxylates have a molecular weight of 6,000 to 18,000, and mixtures thereof;

(B) alkoxylates of straight-chain, branched-chain, and cyclic alcohols containing 3 to 12 carbon atoms and at least 2 hydroxyl groups, wherein each alkoxylate moiety is composed of propoxy units, ethoxy units, or propoxy and ethoxy units, and the alkoxylate has a molecular weight of 6,000 to 50,000, and mixtures thereof; and (C) mixtures of one or more of said dialkoxylates with one or more of said alkoxylates.

Another aspect of the present invention is the aforesaid deinking compositions containing also an anionic surfactant component selected from the group consisting of alkyl and alkenyl polyglyceryl ether sulfonates, the alkyl or alkenyl moiety containing 8 to 18 carbon atoms and 0 to 3 carbon-carbon double bonds, alpha-olefin sulfonates containing 8 to 18 carbon atoms, alkyl ether sulfates of the formula $R^1O-(CH_2CH_2O)_nSO_3Na$ wherein n is 1 to 4 and $R^1$ is $C_8$–$C_{18}$ alkyl, and mixtures thereof.

Another aspect of the present invention is the process of deinking waste paper, by subjecting the waste paper to froth flotation in a liquid composition comprising one or more surfactants selected from the group consisting of (A) cyclohexenyl dialkoxylates of the formula (A)

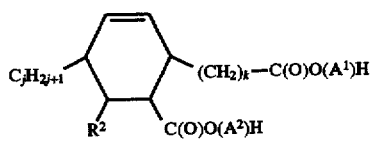

wherein $R^2$ is H or $CH_3$, j is 1–11, k is 1–11 and (j+k) is 10–14, $A^1$ and $A^2$ are polyalkoxy chains composed of propoxy units, ethoxy units, or both propoxy and ethoxy units, and the dialkoxylates have a molecular weight of 6,000 to 18,000, and mixtures thereof;

(B) alkoxylates of straight-chain, branched-chain, and cyclic alcohols containing 3 to 12 carbon atoms and at least 2 hydroxyl groups, wherein each alkoxylate moiety is composed of propoxy units, ethoxy units, or propoxy and ethoxy units, and the alkoxylate has a molecular weight of 6,000 to 50,000, and mixtures thereof;

wherein the liquid composition also optionally comprises an anionic surfactant component selected from the group consisting of alkyl and alkenyl polyglyceryl ether sulfonates, the alkyl group containing 8 to 18 carbon atoms and 0 to 3 carbon-carbon double bonds, alpha-olefin sulfonates containing 8 to 18 carbon atoms, alkyl ether sulfonates of the formula $R^1O-(CH_2CH_2O)_nSO_3Na$ wherein n is 1 to 4 and $R^1$ is $C_8-C_{18}$ alkyl, and mixtures thereof.

In a particularly preferred aspect, waste paper is slurried and subjected to froth flotation in a liquid medium comprising any of the foregoing mixtures of surfactants, whereby ink and the waste paper are separated in the liquid medium, and then separating the slurried waste paper from the liquid medium containing the solubilized ink.

DETAILED DESCRIPTION OF THE INVENTION

The compositions of the present invention are particularly useful in removal of ink from waste paper and more particularly from waste paper comprising mixtures comprising two or more distinct types of paper, whether the paper has been imprinted by conventional impact-printing techniques with any of the inks used in that type of printing, or by non-impact printing techniques (such as laser printing) using any of the types of inks used in that kind of printing. Examples of waste paper include also mixed office waste, newsprint, magazine print, and mixtures of any two or all three of these.

One class of surfactants useful in this invention comprises alkoxylates of straight and/or branched polyhydric alcohols, which alcohols contain 3 to 12 carbon atoms and at least 2 hydroxyl groups. Preferably the alcohol contains 3 to 8–10 hydroxyl groups. The alcohols are alkoxylated with ethoxy groups, propoxy groups, or with both propoxy and ethoxy units. In this as in all other alkoxylated compounds described herein, when both ethoxy and propoxy are present the ethoxy and propoxy units can be present as one or more poly(ethoxy) and one or more poly(propoxy) blocks of two or more such units, or can be intermingled.

It will be understood that useful polyhydric alcohol alkoxylates include any of this formula which can form the desired surfactant composition of the present invention exhibiting the desired properties described herein. Thus, the range of molecular weights, or chain lengths, of polyhydric alcohol alkoxylates of the foregoing description which are useful in the compositions of the present invention vary rather widely. A polyhydric alcohol alkoxylate of the foregoing description will be effective depending on the other components of the composition, but for illustrative purposes it should be understood that the molecular weight of useful polyhydric alcohol alkoxylates of the foregoing description may generally range from about 6,000 to about 50,000, without intending to be bound by the precise numerical values. Satisfactory alkoxylated polyhydric alcohols meeting the foregoing descriptions can be readily synthesized using established industrial synthesis techniques, although numerous examples of satisfactory alkoxylated alcohols are commercially available.

Examples of preferred materials include alkoxylates of glycerol, trimethylol propane, pentaerythritol, sorbitol, and sucrose. Others, including isomers of these polyhydric compounds, will be apparent. It will be recognized that alkoxylates of polyhydric alcohols include dialkoxylates, trialkoxylates, and so forth, depending on the number of pendant alkoxylate chains. Generally, all hydroxyl groups are alkoxylated, but materials in which fewer than all hydroxyl groups are alkoxylated are also within the scope of this invention.

Another class of surfactants useful in this invention are dialkoxylates of the formula (A)

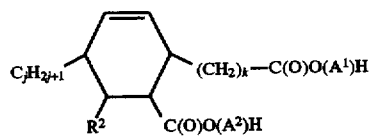

wherein $R^2$ can be H or $CH_3$. Each of $A^1$ and $A^2$ is an alkoxylate chain containing propoxy units, ethoxy units, or both propoxy and ethoxy units. The chains $A^1$ and $A^2$ can be identical or different. When a chain contains propoxy and ethoxy units, the propoxy and ethoxy units can be interspersed or can be present as blocks formed from each type of unit. A chain can have one block of each type of unit, or more than one block of one or both types of unit. The compounds of formula (A) can have a molecular weight in the range of about 6,000 to about 18,000.

Dialkoxylates of formula (A) can be readily formed by reacting the corresponding diacid, which is commercially available, with an appropriately chosen number of moles of ethylene oxide, and propylene oxide, or both, under conventional alkoxylating conditions. Satisfactory diacids include "Westvaco Diacid 1550" and "Westvaco Diacid 1575", available from the Westvaco Corp. in which the principal diacid component corresponds to formula (A) wherein the substituents $A^1$ and $A^2$ are replaced by chemical bonds. These diacids are disclosed more generally in U.S. Pat. No. 3,899,476, the disclosure of which is hereby incorporated herein by reference.

As is shown in the example herein, effective deinking of paper feedstock has been obtained using as the surfactant component one or more cyclohexenyl dialkoxylates of the foregoing formula (A).

An optional component that can be present in the compositions of the present invention is an anionic surfactant component which is an alkyl or alkenyl polyglyceryl ether sulfonate, alpha-olefin sulfonate, alkyl ether sulfate, or a mixture thereof, the terms having the meanings as follows:

By alpha-olefin sulfonates are meant sulfonates of straight and branched alkenyl groups containing 8 to 18 carbon atoms and containing at least one carbon-carbon double bond, as well as the hydroxylated counterparts thereof, including but not limited to compounds exhibiting either of the following formulas (a) and (b), or mixtures thereof, $R^a$—CH=CHSO$_3$Na (a)

$R^a$CHOH—CH$_2$SO$_3$Na (b)

wherein $R^a$ is a straight or branched alkyl group, preferably straight, selected so that the molecule as a whole contains 8 to 18 carbon atoms. Preferred examples of these anionic surfactants include alphaolefin sulfonates containing 14 to 16 carbon atoms in the molecule.

By alkyl ether sulfate is meant compounds of the formula (c)

$R^1O$–(CH$_2$CH$_2$O)$_n$SO$_3$Na (c)

wherein n is 1 to 4, and R is C$_8$–C$_{18}$ alkyl.

Anionic surfactants of the foregoing formulas are commercially available and can readily be synthesized using known industrial chemical techniques. Preferred commercial examples include "Witconate AOS", a sodium C$_{14}$–C$_{16}$ alpha-olefin sulfonate, and "Witcolate ES-3", a sodium lauryl ether sulfate corresponding to the foregoing formula (c) wherein n is 3 and $R^1$ is C$_{12}$–C$_{14}$ alkyl, both of which are sold by Witco Corp.

By alkyl and alkenyl polyglyceryl ether sulfonates is meant a compound or, preferably, a mixture of compounds, selected from the group consisting of alkyl and alkenyl glyceryl ether sulfonates (i.e. containing one glyceryl unit) and monoalkyl and monoalkenyl polyglyceryl ether sulfonates, i.e. composed of a chain of 2 to 6 glyceryl units each of which is substituted with a sulfonate moiety. Most preferred are monoalkyl diglyceryl ether disulfonates, and mixtures of alkyl mono glyceryl ether sulfonate and monoalkyl polyglyceryl ether sulfonates wherein the average chain length of all such compounds in the mixture is 2 glyceryl units per molecule (and thus also 2 sulfonate moieties per molecule). As used herein, the term "diglyceryl ether disulfonates" means both the "dimer" itself and mixtures having, on the average 2 glyceryl units per molecule. The sulfonates are preferably the alkali metal salts thereof and more preferably the sodium salts thereof. The alkyl and alkenyl group can be linear or branched. The preferred alkyl group is dodecyl and the preferred alkenyl group is oleyl. The alkyl or alkenyl group preferably contains 8 to 18 carbon atoms.

The foregoing anionic surfactants have been found to be particularly effective and efficient in the removal of ink from waste paper, particularly when used in froth flotation processes as described below in combination with one or more cyclohexenyl dialkoxylates and/or the polyhydric alkoxylate surfactant components described herein.

The polyhydric alcohol alkoxylate, the cyclohexenyl dialkoxylate, and the anionic surfactant, when two or all three types of surfactant are present, should be present in amounts relative to each other effective to aid in the removal of ink from the waste paper. Generally, the weight ratio of the polyhydric-alcohol alkoxylate to the cyclohexenyl dialkoxylate of formula (A) when both are present should be from 0.1:1 to 10:1. The weight ratio of the anionic surfactant component to the polyhydric-alcohol alkoxylate should be about 10:1 to 0.1:1. The weight ratio of the anionic surfactant to the cyclohexenyl dialkoxylate should be about 10:1 to about 0.1.

Surfactant formulations of the present invention can be produced by simply combining the desired one or more surfactant components in the desired relative amounts, such as by stirring in a suitable tank until the components are thoroughly and homogeneously intermixed. Water may be present, in an amount ranging from 0.1 wt. % to 90 wt. % depending on the desired final concentration of active ingredients.

In general, effective deinking is provided by intimately contacting the waste paper with any of the surfactant formulations of the present invention, preferably in an aqueous or other liquid medium to provide desired fluidity and penetration of the surfactant components to the paper/ink interface. Preferably, the waste paper is first shredded or otherwise converted to small pieces so as to improve the contact of the paper and ink with the liquid medium bearing the surfactants. Of course, appropriate agitation can be provided to enhance the desired contact between the surfactant components and the paper/ink interface.

It is preferred to utilize the surfactant compositions of the present invention in connection with the froth flotation of ink from the waste paper. The general conditions of froth flotation deinking techniques are known in this field. The waste paper is pulped in an aqueous bath, which has preferably been rendered alkaline by appropriate adjustment of the pH via the addition of a base such as sodium hydroxide. Preferably, the pH is about 9 to 11. The desired surfactants are added at amounts calculated to provide the desired ratio between amounts of the respective compounds. The overall amount of surfactant is selected with respect to the quantity of the paper in the cell and with respect to the general amount of ink product on the paper. Generally, the total amount of surfactant comprises about 0.05–0.1 wt. % to about 5.0 wt. % and preferably up to about 1.0 wt. % based on the amount of waste paper present. Lesser amounts of surfactant risk reducing the efficiency of the deinking, whereas higher amounts of surfactant may assist in the deinking of waste paper but not necessarily enhance the efficiency of the deinking in proportion to the additional amounts of surfactant used. The flow of gas, typically air, through the flotation cell agitates the liquid medium and the waste paper, provides enhanced contact with the surfactant, and propels ink particles removed from the waste paper to the top surface where a froth rich in removed ink is established. The froth can be removed continuously or intermittently. After a period of time appropriate for the volume of the cell and the quantity of waste paper and its ink content, the pulp of deinked waste paper is removed from the cell for further processing toward the recovery and reuse in regenerated paper products.

The present invention has been found to provide improved effectiveness and efficiency in the deinking of waste paper, particularly waste paper comprising mixtures of different types of paper. The enhanced deinking has been determined through analysis for the gain in brightness of the recovered paper product and for the percentage of ink removed (in total and as large particle removal), as well as for the percentage of fiber recovered in the regenerated product.

The following examples demonstrate the significant and favorable results that are obtained in the practice of the present invention.

EXAMPLE 1

Mixed office waste paper samples were pulped for 30 minutes and then screened on a screen with a slot size of 0.008 in. Separately, a batch of 100% white laser-printed paper, and a batch of old newsprint, were also pulped and screened.

The surfactant was mixed in water for 5 minutes before being added to the flotation cell, a Voith laboratory flotation cell. The amount of surfactant was 0.1 wt. % based on oven-dried weight of the pulp. The slurry in the flotation cell comprised 1 wt. % solids. The laser-printed paper was added in varying amounts to the pulped mixed office waste, when the mixed office waste and surfactant(s) had been mixed for 5 minutes.

A control sample (no surfactant) and the various samples with surfactant were subjected to flotation for 10 minutes at a pH of 10 and a temperature of 85°–115° F. Foam was manually skimmed off the surface. The pulp was then dewatered, and the yield (of pulp), dirt content, brightness, and color were determined.

Table 1-A contains the content of the paper samples ("furnishes") containing mixed office waste and laser-printed paper, in weight percent.

TABLE 1-A

|  | Paper Sample | | | |
|---|---|---|---|---|
|  | A | B | C | D |
| Laser-printed | 14.2 | 50.0 | 30.0 | 50.0 |
| Mixed office waste | 85.8 | 50.0 | 70.0 | 50.0 |
| —content of the mixed office waste: | | | | |
| White | 72.8 | 77.9 | 77.7 | 84.1 |
| Deep tones | 2.9 | 2.4 | 2.3 | 1.7 |
| Groundwood | 7.0 | 4.3 | 5.7 | 4.1 |
| Unbleached | 3.2 | 2.5 | 2.6 | 1.9 |
| Pastel | 7.0 | 7.2 | 5.7 | 4.1 |
| Miscellaneous | 7.2 | 5.7 | 5.9 | 4.2 |

Table 1-B reports the effectiveness of different surfactants used in this test, measured as the percent decrease in the dirt content of the pulp compared to standards 2, 3 and 4.

TABLE 1-B

| % Decrease in Dirt Content Following Flotation | | | | | | |
|---|---|---|---|---|---|---|
| Surfactant | Furnish A | | Furnish A | | Furnish B | |
| Sample | ppm | count | ppm | count | ppm | count |
| 1 | 58.3 | 65.2 | 51.2 | 56.8 | 34.4 | 41.1 |
| 2 | 35.0 | 44.7 | | | 7.7 | 15.9 |
| 3 | 10.0 | 16.6 | | | | |
| 4 | 49.5 | 53.2 | | | 19.1 | 28.2 |

| Surfactant | Furnish C | | Furnish D | | Old Newsprint | |
|---|---|---|---|---|---|---|
| Sample | ppm | count | ppm | count | ppm | count |
| 1 | 0.2 | 21.1 | 49.9 | 58.6 | 5.0 | 10.9 |
| 2 | 28.4 | 46.4 | 5.0 | 10.9 | −2.9 | 6.4 |
| 5 | | | 29.5 | 36.0 | 60.0 | 69.7 |

LEGEND
1. A dialkoxylate of formula (A) made by alkoxylating the corresponding diacid with, in order, 4EO (i.e. 4 moles of ethylene oxide per mole of diacid) + 98PO (98 moles of propylene oxide per mole of diacid) + 40EO + 5PO + 40EO + 5PO + 40EO
2. Lionsurf 727 (an industry standard)
3. Lionsurf 779 (an industry standard)
4. DI600 (an industry standard)
5. Witconate AOS (60%) + Surfactant No. 1 (40%)

EXAMPLE 2

This example describes the invention and the effect of surfactant concentration carried out on two furnishes. The furnishes used in this Example were a mixed office waste (MOW) and old newsprint/magazine (ONP/OMG). MOW consisted of 70% ONP and 30% OMG. Fourteen surfactants were evaluated as flotation deinking agents. The surfactant contents in the flotation cell were 0.3, 0.6 and 0.9 wt. % based on dry solids. The performance of the surfactants of the present invention was compared to two commercially available surfactants. The deinking efficiency of the surfactants was quantified as brightness increase of the pulp, particle removal from the pulp, and overall yield of fiber.

The furnishes were repulped in a Modern Laboratory Slush-Maker at 2900 rpm, and 6 wt. % consistency. Initially water (28.4 liters) was added, then steam was injected to increase the temperature to 120° F. Four-pound batches were added over 5 minutes to maintain stock circulation in the Slush-Maker. The pH was adjusted to 10 with 5% NaOH. The repulping was performed at the following conditions:

| Consistency | 6 wt. % |
|---|---|
| Temperature | 120° F. |
| pH | 10 |
| Repulping time | 30 minutes |

After repulping, the stock from the Slush-Maker was diluted to approximately 0.8 wt. % consistency to make a "master batch". The temperature of the master batch was adjusted to 100° F. before it was fed to the flotation cell.

FLOTATION

Flotation was performed in a laboratory-scale flotation cell which had a 7.7 gallon capacity. The furnish was added manually to approximately 0.8 wt. % consistency in the flotation cell. The furnish was recirculated in the flotation cell at 15 gal/minute for mixing. All the surfactants were first separately diluted to 68.1 gms/liter and then added to the cell at 0.3, 0.6 or 0.9 wt. %, based on dry solids.

The surfactants were allowed to mix five minutes in the cell prior to starting the compressed air flow to the cell. The air was then begun, at 8 ft³/minute. Inky foam formed on the surface and was rejected out of the center of the cell. The flotation cell was operated for ten minutes while rejects were collected. Three flotation runs were performed at the three different addition levels with one master batch. Samples of feed and accepts were collected for brightness comparison pads. Rejects were collected and weighed for yield calculation.

BRIGHTNESS PADS

After repulping and flotation, portions of the furnish were taken to make brightness pads (TAPPI Standard T-218). Five air dried brightness pads were made for brightness and particle count. Brightness was measured (two readings on each side of five sheets) on the pad surface using a S4-M brightmeter.

YIELD

The flotation yield was calculated using the equation below.

Capacity of flotation cell=7.69 gallon
Mass of flotation cell=29121 grams
$C_F$=Consistency of Feed
$C_R$=Consistency of Reject
$W_R$=Weight of reject $$\text{Yield} = 100 \times \frac{((29121 \times C_F) - (W_R \times C_P))}{(29121 \times C_f)}$$

IMAGE ANALYSIS

Particle count measurements were performed on a Spec-Scan® image analyzer. It uses a HP Scan Jet scanner to digitize the image of the paper samples at resolutions up to 800 dots per inch; thus it can detect dirt and/or ink specks as small as 0.032 mm in diameter or about 0.001 mm$^2$ and counts and categorizes the specks size. Scanning was performed only for the MOW furnish. Ten four inch round circles were scanned for each sample. The total area scanned for each sample was 0.042 m$^2$.

The various surfactants tested are described in Table 2-A.. The results of the testing of MOW are set forth in Table 2-B. The results of the testing of ONP/OMG are set forth in Table 2-C.

The results in these examples demonstrate that the surfactant components of the present invention provide superior deinking of waste paper.

TABLE 2-A

| Surfactant | Description |
|---|---|
| 1 | "Lionsurf 727" (an industry standard) |
| 2 | "DI 600" (an industry standards) |
| 3 | A dialkoxylate of Formula (A) wherein A$^1$ and A$^2$ contain a total of 124 moles of ethylene oxide ("EO") and 108 moles of propylene oxide ("PO") per mole of diacid; in alternating blocks |
| 4 | A dialkoxylate of Formula (A) wherein A$^1$ and A$^2$ contain a total of 60 moles of ethylene oxide ("EO") and 55 moles of propylene oxide ("PO") per mole of diacid; in alternating blocks |
| 5 | A dialkoxylate of Formula (A) wherein A$^1$ and A$^2$ contain a total of 175 moles of ethylene oxide ("EO") and 58 moles of propylene oxide ("PO") per mole of diacid; in alternating blocks |
| 6 | Alkoxylate of trimethylol propane with 185 moles of EO and 160 moles of PO in alternating blocks |
| 7 | Alkoxylate of pentaerythritol with 250 moles of EO and 220 moles of PO in alternating blocks |
| 8 | Alkoxylate of sucrose with 500 moles of EO and 450 moles of PO in alternating blocks |
| 9 | Alkoxylate of sorbitol with 350 moles of EO and 325 moles of PO in alternating blocks |
| 10 | Dodecyl diglyceryl ether disodium disulfonate |
| 11 | Mixture of 60 wt. % Surfactant 10 and 40 wt. % butanol alkoxylate ("Witconol NS500LQ", Witco Corp.) |

TABLE 2-B

| | | % Increase | | % Decrease in Particles | |
|---|---|---|---|---|---|
| Surfactant | % Active | In Brightness | % Fiber Yield | <32 Microns | >225 Microns |
| 1 | 0.3 | 4.58 | 95.35 | 93.18 | 100.00 |
| | 0.6 | 4.33 | 92.72 | 89.84 | 100.00 |
| | 0.9 | 3.95 | 90.40 | 81.61 | 42.78 |
| 2 | 0.3 | 6.75 | 96.84 | 94.55 | 69.50 |
| | 0.6 | 6.26 | 95.22 | 87.44 | 85.35 |
| | 0.9 | 5.94 | 93.97 | 87.12 | 80.53 |
| 3 | 0.3 | 6.35 | 96.30 | 95.77 | 94.61 |
| | 0.6 | 6.09 | 93.64 | 84.25 | 68.42 |
| | 0.9 | 5.31 | 92.01 | 76.33 | 65.69 |
| 4 | 0.3 | 7.74 | 95.17 | 96.86 | 84.97 |
| | 0.6 | 7.32 | 93.69 | 90.18 | 75.35 |
| | 0.9 | 7.27 | 91.13 | 87.44 | 66.07 |
| 5 | 0.3 | 4.95 | 97.83 | 97.92 | 94.47 |
| | 0.6 | 4.92 | 94.77 | 96.51 | 94.99 |
| | 0.9 | 5.25 | 92.80 | 93.77 | 89.46 |
| 6 | 0.3 | 5.01 | 96.91 | 97.17 | 97.29 |
| | 0.6 | 4.23 | 93.78 | 92.98 | 79.66 |
| | 0.9 | 4.60 | 90.48 | 92.18 | 91.22 |
| 8 | 0.3 | 5.72 | 97.52 | 98.60 | 94.84 |
| | 0.6 | 5.69 | 96.19 | 97.86 | 97.35 |
| | 0.9 | 5.69 | 93.42 | 97.53 | 97.88 |
| 9 | 0.3 | 5.61 | 96.37 | 99.19 | 99.50 |
| | 0.6 | 5.75 | 94.10 | 92.84 | 92.32 |
| | 0.9 | 5.73 | 92.08 | 89.83 | 76.83 |
| 10 | 0.3 | 4.47 | 98.87 | 97.20 | 93.44 |
| | 0.6 | 4.02 | 98.45 | 97.88 | 93.78 |
| | 0.9 | 4.79 | 96.74 | 98.27 | 93.49 |
| 11 | 0.3 | 5.15 | 97.67 | 96.10 | 80.61 |
| | 0.6 | 4.64 | 96.82 | 97.51 | 85.23 |
| | 0.9 | 4.70 | 96.03 | 97.95 | 95.24 |

TABLE 2-C

| Surfactant | % Active | % Increase In Brightness | % Fiber Yield |
|---|---|---|---|
| 1 | 0.3 | 15.44 | 92.60 |
| | 0.6 | 13.92 | 89.42 |
| | 0.9 | 11.56 | 86.79 |
| 2 | 0.3 | 12.03 | 94.44 |
| | 0.6 | 9.72 | 91.77 |
| | 0.9 | 10.23 | 89.04 |
| 3 | 0.3 | 11.75 | 91.60 |
| | 0.6 | 11.15 | 89.94 |
| | 0.9 | 9.98 | 89.10 |
| 4 | 0.3 | 11.46 | 92.11 |
| | 0.6 | 12.28 | 89.54 |
| | 0.9 | 13.13 | 88.45 |
| 5 | 0.3 | 10.02 | 91.18 |
| | 0.6 | 9.57 | 88.54 |
| | 0.9 | 10.29 | 88.12 |
| 6 | 0.3 | 11.15 | 92.72 |
| | 0.6 | 9.03 | 90.40 |
| | 0.9 | 7.99 | 90.40 |
| 7 | 0.3 | 13.46 | 91.00 |
| | 0.6 | 12.80 | 89.79 |
| | 0.9 | 11.57 | 88.91 |
| 9 | 0.3 | 9.51 | 90.98 |
| | 0.6 | 9.29 | 88.89 |
| | 0.9 | 7.87 | 88.95 |
| 10 | 0.3 | 11.55 | 90.77 |
| | 0.6 | 12.47 | 91.56 |
| | 0.9 | 7.80 | 91.56 |
| 11 | 0.3 | 6.05 | 98.95 |
| | 0.6 | 6.63 | 98.53 |
| | 0.9 | 3.74 | 94.27 |

What is claimed is:

1. A deinking composition useful in the froth flotation deinking of waste paper, comprising a surfactant comprising a mixture of one or more (A) cyclohexenyl dialkoxylates of the formula (A)

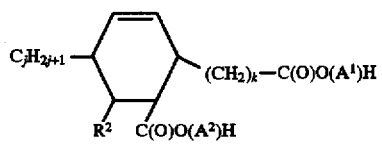

wherein $R^2$ is H or $CH_3$, j is 1–11, k is 1–11, and (j+k) is 10–14, $A^1$ and $A^2$ are alkoxylate chains composed of propoxy units, ethoxy units, or both propoxy and ethoxy units, and the dialkoxylate has a molecular weight of 6,000 to 18,000, and mixtures thereof; and one or more (B) alkoxylates of straight-chain, branched-chain, and cyclic polyhydric alcohols containing 3 to 12 carbon atoms and at least 2 hydroxyl groups, wherein each alkoxylate chain is composed of propoxy units, ethoxy units, or propoxy and ethoxy units, wherein the alkoxylate has a molecular weight of 6,000 to 50,000, and mixtures thereof.

2. A deinking composition according to claim 1 wherein each of said alkoxylate chains of said cyclohexenyl dialkoxylates contains at least one block of two or more ethoxy units and at least one block of two or more propoxy units.

3. A deinking composition according to claim 1 comprising one or more anionic surfactants selected from the group consisting of alkyl and alkenyl diglyceryl ether disulfonates, the alkyl and alkenyl moieties containing 8 to 18 carbon atoms and 0 to 3 carbon-carbon double bonds, alpha-olefin sulfonates containing 8 to 18 carbon atoms, alkyl ether sulfates of the formula $R^1O\text{-}(CH_2CH_2O)_nSO_3Na$ wherein n is 1 to 4 and $R^1$ is alkyl containing 8 to 18 carbon atoms, and mixtures thereof.

4. A deinking composition according to claim 3 wherein each of said alkoxylate chains contains at least one block of two or more ethoxy units and at least one block of two or more propoxy units.

5. A deinking composition according to claim 3 comprising an alkyl or alkenyl diglyceryl ether disulfonate, the alkyl or alkenyl group containing 8 to 18 carbon atoms.

6. A deinking composition according to claim 3 comprising an alpha-olefin sulfonate containing 8 to 18 carbon atoms.

7. A deinking composition according to claim 3 comprising an alkyl ether sulfate of the formula $R^1O\text{-}(CH_2CH_2O)_nSO_3Na$ wherein n is 1 to 4 and $R^1$ is alkyl containing 8 to 18 carbon atoms.

8. A deinking composition according to claim 1 wherein each of said alkoxylate chains of said alkoxylates of a straight-chain, branched-chain or cyclic polyhydric alcohols contains at least one block of two or more ethoxy units and at least one block of two or more propoxy units.

9. A deinking composition according to claim 8 wherein said alkoxylate of a polyhydric alcohol is an alkoxylate of glycerol.

10. A deinking composition according to claim 8 wherein said alkoxylate of a polyhydric alcohol is an alkoxylate of trimethylol propane.

11. A deinking composition according to claim 8 wherein said alkoxylate of a polyhydric alcohol is an alkoxylate of pentaerythritol.

12. A deinking composition according to claim 8 wherein said alkoxylate of a polyhydric alcohol is an alkoxylate of sorbitol.

13. A deinking composition according to claim 8 wherein said alkoxylate of a polyhydric alcohol is an alkoxylate of sucrose.

14. A deinking composition according to claim 8 comprising one or more anionic surfactants selected from the group consisting of alkyl and alkenyl diglyceryl ether disulfonates, the alkyl and alkenyl groups containing 8 to 18 carbon atoms and 0 to 3 carbon-carbon double bonds, alpha-olefin sulfonates containing 8 to 18 carbon atoms, alkyl ether sulfates of the formula $R^1O\text{-}(CH_2CH_2O)_nSO_3Na$ wherein n is 1 to 4 and $R^1$ is alkyl containing 8 to 18 carbon atoms, and mixtures thereof.

15. A deinking composition according to claim 14 comprising an alkyl or alkenyl diglyceryl ether disulfonate, the alkyl or alkenyl group containing 8 to 18 carbon atoms and 0 to 3 carbon-carbon double bonds.

16. A deinking composition according to claim 3 comprising an alpha-olefin sulfonate containing 8 to 18 carbon atoms.

17. A deinking composition according to claim 3 comprising an alkyl ether sulfate of the formula $R^1O\text{-}(CH_2CH_2O)_nSO_3Na$ wherein n is 1 to 4 and $R^1$ is alkyl containing 8 to 18 carbon atoms.

18. The method of deinking waste paper comprising subjecting said waste paper to froth flotation in an aqueous medium comprising a composition in accordance with claim 1.

19. The method of deinking waste paper comprising subjecting said waste paper to froth flotation in an aqueous medium comprising a composition in accordance with claim 2.

20. The method of deinking waste paper comprising subjecting said waste paper to froth flotation in an aqueous medium comprising a composition in accordance with claim 3.

21. The method of deinking waste paper comprising subjecting said waste paper to froth flotation in an aqueous medium comprising a composition in accordance with claim 4.

22. The method of deinking waste paper comprising subjecting said waste paper to froth flotation in an aqueous medium comprising a composition in accordance with claim 5.

23. The method of deinking waste paper comprising subjecting said waste paper to froth flotation in an aqueous medium comprising a composition in accordance with claim 6.

24. The method of deinking waste paper comprising subjecting said waste paper to froth flotation in an aqueous medium comprising a composition in accordance with claim 7.

25. The method of deinking waste paper comprising subjecting said waste paper to froth flotation in an aqueous medium comprising a composition in accordance with claim 8.

26. The method of deinking waste paper comprising subjecting said waste paper to froth flotation in an aqueous medium comprising a composition in accordance with claim 9.

27. The method of deinking waste paper comprising subjecting said waste paper to froth flotation in an aqueous medium comprising a composition in accordance with claim 10.

28. The method of drinking waste paper comprising subjecting said waste paper to froth flotation in an aqueous medium comprising a composition in accordance with claim 11.

29. The method of deinking waste paper comprising subjecting said waste paper to froth flotation in an aqueous medium comprising a composition in accordance with claim 12.

30. The method of deinking waste paper comprising subjecting said waste paper to froth flotation in an aqueous medium comprising a composition in accordance with claim 13.

31. The method of deinking waste paper comprising subjecting said waste paper to froth flotation in an aqueous medium comprising a composition in accordance with claim 14.

32. The method of deinking waste paper comprising subjecting said waste paper to froth flotation in an aqueous medium comprising a composition in accordance with claim 15.

33. The method of deinking waste paper comprising subjecting said waste paper to froth flotation in an aqueous medium comprising a composition in accordance with claim 16.

34. The method of deinking waste paper comprising subjecting said waste paper to froth flotation in an aqueous medium comprising a composition in accordance with claim 17.

* * * * *